(12) United States Patent
Moore et al.

(10) Patent No.: US 6,709,485 B1
(45) Date of Patent: Mar. 23, 2004

(54) PROCESS OF REMOVING CARBON DIOXIDE FROM A CHLOR/ALKALI PLANT TAIL GAS STREAM

(75) Inventors: Sanders H. Moore, Ooltewah, TN (US); James F. Pickering, Cleveland, TN (US); Carey O. Burger, Cleveland, TN (US)

(73) Assignee: Olin Corporation, Norwalk, CT (US)

( * ) Notice: Subject to any disclaimer, the term of this patent is extended or adjusted under 35 U.S.C. 154(b) by 0 days.

(21) Appl. No.: 10/309,631

(22) Filed: Dec. 4, 2002

(51) Int. Cl.$^7$ .......................... B01D 53/04; B01D 53/14; B01D 53/68
(52) U.S. Cl. .............. 95/92; 95/139; 95/233; 423/241
(58) Field of Search ............... 95/92–94, 139, 95/233; 423/240 R, 240 S, 241

(56) References Cited

U.S. PATENT DOCUMENTS

| | | | | |
|---|---|---|---|---|
| 3,001,607 A | * | 9/1961 | Eng et al. ...................... | 95/93 |
| 3,078,638 A | * | 2/1963 | Milton ......................... | 95/139 |
| 3,078,639 A | * | 2/1963 | Milton ......................... | 95/139 |
| 3,168,376 A | | 2/1965 | Nealy et al. .................... | 23/219 |
| 3,266,221 A | * | 8/1966 | Avery .......................... | 95/105 |
| 3,734,709 A | * | 5/1973 | Pischinger et al. ............. | 71/59 |
| 4,012,206 A | | 3/1977 | Macriss et al. ................. | 55/34 |
| 4,581,044 A | * | 4/1986 | Uno et al. ..................... | 95/96 |
| 4,762,537 A | | 8/1988 | Fleming et al. ................. | 55/71 |
| 4,765,808 A | | 8/1988 | Oigo et al. .................... | 55/68 |
| 5,124,135 A | * | 6/1992 | Girrbach et al. ............. | 423/241 |
| 5,269,834 A | | 12/1993 | Dotson et al. ................. | 93/104 |
| 5,296,017 A | | 3/1994 | Kono et al. .................... | 95/14 |
| 5,424,051 A | * | 6/1995 | Nagji et al. .................. | 423/234 |
| 5,447,558 A | * | 9/1995 | Acharya ........................ | 95/104 |
| 5,531,808 A | * | 7/1996 | Ojo et al. ..................... | 95/96 |
| 5,656,557 A | | 8/1997 | Hata et al. ................... | 423/219 |
| 5,788,743 A | * | 8/1998 | Watzenberger et al. ......... | 95/94 |
| 5,919,286 A | * | 7/1999 | Golden et al. ................. | 95/98 |
| 6,309,445 B1 | * | 10/2001 | Gittleman et al. ............. | 95/96 |
| 2001/0009125 A1 | | 7/2001 | Monereau et al. ............ | 95/117 |
| 2001/0049998 A1 | * | 12/2001 | Rode et al. .................... | 95/117 |

OTHER PUBLICATIONS

MOLSIV™ ADSORBENT Type 4A Product Information Brochure.
MOLSIV™ ADSORBENT Type 13X Product Information Brochure.
MOLSIV™ ADSORBENT Type 5A Product Information Brochure.

* cited by examiner

Primary Examiner—Robert H. Spitzer
(74) Attorney, Agent, or Firm—Wiggin & Dana LLP; William A. Simons

(57) ABSTRACT

A process for removing chlorine gas from the tail gas stream of a chlor/alkali plant or other chemical processes comprising the steps of:

(a) contacting a chlorine-, hydrogen-, and carbon dioxide-containing tail gas stream with a zeolite molecular sieve having a molecular pore diameter greater than the molecular diameter of the carbon dioxide and hydrogen and smaller than the molecular diameter of chlorine so that at least a portion of the carbon dioxide is absorbed onto the molecular sieve, and thereby producing a purified tail gas stream that contains substantially all of the chlorine and hydrogen values and a reduced amount or no amount of carbon dioxide values; and (b) contacting the purified tail gas stream with an aqueous sodium hydroxide scrubbing solution in order to remove substantially all of the chlorine values from the purified tail gas stream, whereby producing a purified sodium hypochlorite solution that is substantially free of sodium carbonate.

8 Claims, No Drawings

PROCESS OF REMOVING CARBON DIOXIDE FROM A CHLOR/ALKALI PLANT TAIL GAS STREAM

BACKGROUND OF THE INVENTION

1. Field of the Invention

The present invention relates to a process for removing carbon dioxide from a chlorine-containing tail gas stream from a chlor/alkali plant or other chemical processing plant. In particular, this invention relates to a process for removing carbon dioxide from a chlorine-containing gas stream wherein a zeolite molecular sieve is used to selectively absorb the carbon dioxide and thus form a purified chlorine-containing gas stream having lower values of carbon dioxide and then, passing the purified chlorine stream through a NaOH scrubber.

2. Brief Description of Art

Tail gas streams from chlor/alkali plants typically contain a mixture of about 0.1% to about 10% chlorine ($Cl_2$); about 0.1% to about 4% hydrogen ($H_2$) (percentages are on a volume basis) as well as values of oxygen ($O_2$), nitrogen ($N_2$) and carbon dioxide ($CO_2$). The chlorine values must be removed so that they are not released into the air and, being a valuable product, are recovered. The chlorine is typically removed by scrubbing the tail gas stream with aqueous NaOH to form a sodium hypochlorite (NaOCl or hypo) solution. Alternatively, at least one producer uses an organic solvent (i.e. $CCl_4$) to scrub tail gases.

However, the tail gas stream also contains $CO_2$ which also reacts with NaOH to form $Na_2CO_3$ (sodium carbonate). Thus, the hypo solution will contain sodium carbonate impurities. The presence of sodium carbonate may cause an undesirable cloudiness in the hypo, especially when the hypo solution is made with hard water (i.e., containing elevated levels of calcium). Specifically, it is very difficult to separate sodium carbonate and sodium hypochlorite, once produced in an aqueous solution. Thus, it is highly desirable to remove at least a portion, if not all, of the carbon dioxide values from the tail gas stream before the NaOH scrubber, thereby creating a more saleable product.

U.S. Pat. No. 5,296,017 (Kono et al.) teaches the use of zeolite molecular sieve in a pressure swing adsorption (PSA) apparatus thereby an impure chlorine gas is first adsorbed onto an adsorbent and then desorbed off of that adsorbent to produce a purified chlorine gas stream. A drawback to this method is that it is difficult to regenerate the zeolite bed once chlorine is adsorbed.

Separately, U.S. Pat. Nos. 5,656,557 (Hata et al.); U.S. Pat. No. 4,765,808 (Oigo et al.); U.S. Pat. No. 4,012,206 (Macriss et al.) and U.S. Pat. No. 4,762,537 (Fleming et al.) disclose zeolite sieves to purify air (i.e. to remove carbon dioxide and other impurities from the air) and U.S. Published Patent Application No. 2001/009125 (Monereau et al.) disclose the use of a zeolite sieve to purify hydrogen gas. These references do not suggest that this sieve is useful to purify chlorine-containing gas stream.

In the area of liquid/gas separations, U.S. Pat. Nos. 3,168,376 (Neely) and U.S. Pat. No. 5,269,834 (Dotson et al.) disclose the use of a zeolite-type molecular sieve to purify liquid chlorine from impurities such as carbon dioxide. There is no suggestion in these patents that these sieves would be useful to purify a chlorine-containing gas stream.

Accordingly, there still is a need to find a better way to remove carbon dioxide impurities from a chlorine-containing gas stream before the NaOH scrubbing operation.

BRIEF SUMMARY OF THE INVENTION

Therefore, one aspect of the present invention is directed to a process for removing chlorine gas from the tail gas stream of a chlor/alkali plant or other chemical processes comprising the steps of:

(a) contacting a chlorine-, hydrogen-, and carbon dioxide-containing tail gas stream with a zeolite molecular sieve having a molecular pore diameter greater than the molecular diameter of the carbon dioxide and hydrogen and smaller than the molecular diameter of chlorine so that at least a portion of the carbon dioxide is absorbed onto the molecular sieve, and thereby producing a purified tail gas stream that contains substantially all of the chlorine and hydrogen values and a reduced or no amount of carbon dioxide values; and (b) contacting the purified tail gas stream with an aqueous sodium hydroxide scrubbing solution for a sufficient amount of time in order to remove substantially all of the chlorine values from the purified tail gas stream, whereby producing a purified sodium hypochlorite solution that is substantially free of sodium carbonate.

The oxygen, nitrogen and hydrogen values in the purified tail gas stream are released to the atmosphere after this scrubbing operation.

DETAILED DESCRIPTION OF THE INVENTION

The term "tail gas stream" or "impure tail gas stream" used in the present specification and claims means any tail gas stream from a chlor/alkali plant that contains chlorine, hydrogen and carbon dioxide values." The tail gas streams from either membrane-, mercury- and diaphragm-type chlor/alkali plants may be used in this process. Generally, the initial amount of carbon dioxide impurities in the tail gas stream is from about 2% to about 4%, by volume when an alkaline brine is used as the feed for a chlor/alkali plant or from about 0.1% to about 0.5% when an acid brine is used as feed.

The term 'purified tail gas stream" as used in the present specification and claims refers to a tail gas stream that has at least a portion of its carbon dioxide values removed therefrom.

The term "purified sodium hypochlorite solution as used in the present specification and claims refers to a sodium hypochlorite stream being substantially free of sodium carbonate.

The term "substantially all" as referring to chlorine and hydrogen values in the present specification and claims means that at least 90% have been removed.

The term "aqueous sodium hydroxide scrubbing solution" as used in the present specification and claims means any aqueous solution of sodium hydroxide that is useful to remove chlorine values from a chlorine-containing gas stream. The preferred NaOH content in the sodium hydroxide scrubbing solution may be any desirable concentration up to 50% NaOH concentration by weight. Preferably, the NaOH concentration in the scrubbing solution is from about 15% to about 50% by weight of the scrubbing solution. The resulting hypo solution after this contacting, preferably scrubbing step, contains about 5% to 32% sodium hypochlorite. This solution is saleable as is depending upon customer's requirements, but it may optimally be desirable for certain applications to pass the solution through a filter (e.g., a 2 micron filter cartridge) to remove any remaining particulate impurities before use.

The term "zeolite molecular sieve" as used in the present specification and claims means any suitable molecular sieve that selectively absorbs carbon dioxide values without substantially absorbing any chlorine or hydrogen values.

The present inventive entails removing chlorine values from a tail gas stream from a chlor/alkali plant. Any tail gas stream that contains chlorine, carbon dioxide, nitrogen, oxygen and carbon dioxide may preferably be used in the process of the present invention. The initial chlorine concentration will preferably range from about 0.1% to about 10% by volume. Preferably, the hydrogen values will range about 0.1% to 3% by volume, of the tail gas stream. The oxygen and nitrogen values together make up the residual and remaining major components of the tail gas stream.

The first step of the inventive process involves contacting the tail gas stream with a zeolitic molecular sieve of a certain pore size. Preferably, the molecular sieve size is from about 4 angstroms to about 10 angstroms; more preferably, from about 4 angstroms to about 5 angstroms. Any suitable zeolitic molecular sieve may be useful. These molecular sieves are commonly made from aluminosilicates. See, for example, Breck, D. Education, Vol. 41, p. 678 (December 1964) See also, Cotton. F. A. and Wilkinson, G., Advanced Inorganic Chemistry-A Comprehensive Text, pp. 390–392, $4^{th}$ Ed., John Wiley and Sons (New York 1980).

Preferred types of Molecular Sieves are MOLSIV™ Adsorbent Types 4A, 5A and 13A available from UOP.

These molecular sieve materials are preferably placed in a column where the tail gas must pass through. The tail gas stream generally passes downward through the molecules sieve materials and is in contact with them so that at least a portion of the carbon dioxide values in the tail gas stream are absorbed onto the sieve material. The present invention also contemplates recycling the tail gas streams through the sieve material or using more than one zone of molecular sieve material to increase absorption.

The amount of molecular sieve material and the flow rate of the tail gas material are preferably adjusted to obtain the desired amount of carbon dioxide removed.

After the tail gas stream has passed through the zeolite molecular sieve material, the resulting purified tail gas stream is ready to be scrubbed with an aqueous sodium hydroxide solution in a conventional NaOH gas scrubber.

In the scrubber, substantially all of the chlorine values in the purified tail gas stream are removed and preferably form sodium hypochlorite in the aqueous scrubber solution.

The resulting purified substantially-chlorine free tail gas stream (preferably at least 90%, more preferably, at least 99% of the initial chlorine values have been removed) still containing oxygen, hydrogen and nitrogen values could be released to the air or reused in the chlor/alkali plant.

The zeolite molecular sieve material could be treated to remove the carbon dioxide values absorbed therein. This could be done by running a heated nitrogen gas stream upward (or countercurrent) through the molecular sieve column or heating externally the containment vessel that the molecular sieve resides in or both. This will desorb or regenerate the carbon dioxide off of the molecular sieve material. Preferably, this nitrogen gas stream is heated to about 200–300° F., more preferably, at about 250° F. At these elevated temperatures, the molecule sieve expands to release the $CO_2$. The level of hydrogen in the column during this desorption is preferably checked to see that it is not at an undesirable high level (i.e. not over 4% by volume).

The present invention is further described in detail by means of the following Examples and Comparisons. All parts and percentages are by weight and all temperatures are degrees Celsius unless explicitly stated otherwise.

EXAMPLES

In the operation of chlorine plants inert gases (or non-condensable gases) are disposed of through the adsorption in a caustic media. Since no chlorine recovery system (commonly called a liquefaction process) dynamics achieves 100% of the chlorine removal, the chlorine disposal into the caustic media forms bleach (or sodium hypochlorite) as a saleable product. The primary contamination is the carbon dioxide ($CO_2$) at significant concentrations within the waste gas stream.

Sieve Materials:

The following molecular sieve materials are commercially available in several pore-sizing configurations. Per the manufacturing product information sheets:

MOLSIV®ADSORBENT Type 3A is the potassium form of the Type A crystal structure. The sieve is an alkali metal alumino-silicate and will adsorb molecules with critical diameters up to 3 angstroms.

MOLSIV®ADSORBENT Type 4A is the sodium form of the Type A crystal structure. The sieve is an alkali metal alumino-silicate and will adsorb molecules with critical diameters up to 4 angstroms.

MOLSIV®ADSORBENT Type 5A is the calcium form of the Type A crystal structure. The sieve is an alkali metal alumino-silicate and will adsorb molecules with critical diameters up to 5 angstroms.

MOLSIV®ADSORBENT Type 13X is the sodium form of the Type X crystal structure. The sieve is an alkali metal alumino-silicate and will adsorb molecules with critical diameters up to 10 angstroms.

Test Protocol:

Weight Basis:

All of the above-noted molecular sieves were tested. Each molecular sieve was packed into columns of 1 inch inside and 2 feet of molecular sieve material. Column weights (grams) before and after operations are shown in Table 1:

TABLE 1

| Sieve Type | Weight Initial | No. of Runs | Weight Re-Check |
|---|---|---|---|
| 3A | 206.37 | 1 | 206.29 |
| 4A | 200.29 | 5 | 202.88 |
| 5A | 214.30 | 3 | 213.21 |
| 13X | 181.33 | 1 | 183.73 |

Operations:

For all the operational runs, the flow rate of the tail gas was held at 1.0 liter/minute. At specific time interval, samples were taken and tested using standard gas chromatograpy. Quantity of measured $CO_2$ adsorbed are in grams. Sieve was reused for each run after being regenerated with heated counter current nitrogen gas between runs. Regeneration temperature held at 250° F.

COMPARISON DATE OF MOLECULAR SIEVE
PERFORMANCE TESTING BY SIZE

TABLE II

Sieve Size: 3A

| Time (Min.) | $H_2$ (%) | $CO_2$ (%) | $CO_2$ Adsorbed (grams) |
|---|---|---|---|
| 0 | 0.34 | 2.78 | 0 |
| 30 | 0.36 | 2.57 | 0.12 |
| 60 | 0.34 | 2.63 | 0.21 |
| 90 | 0.33 | 2.65 | 0.29 |
| 120 | 0.35 | 2.74 | 0.31 |
| 150 | 0.35 | 2.74 | 0.34 |
| 180 | — | — | 1.97 |
| 210 | 0.30 | 2.30 | 2.26 |
| End Run | 0.30 | 2.33 | |

TABLE III

Sieve Size: 4A-Run 1

| Time (Min.) | $H_2$ (%) | $CO_2$ (%) | $CO_2$ Adsorbed (grams) |
|---|---|---|---|
| 0 | 0.32 | 2.92 | 0 |
| 30 | 0.27 | 0.22 | 1.59 |
| 60 | 0.34 | 0.01 | 3.31 |
| 90 | 0.24 | 0.03 | 5.01 |
| 120 | 0.33 | 0.00 | 6.73 |
| 150 | 0.31 | 0.10 | 8.39 |
| 180 | 0.24 | 2.47 | 8.66 |
| 210 | 0.13 | 1.04 | 9.77 |
| End Run | 0.24 | 2.55 | |

TABLE IV

Sieve Size: 4A-Run 2

| Time (Min.) | $H_2$ (%) | $CO_2$ (%) | $CO_2$ Adsorbed (grams) |
|---|---|---|---|
| 0 | 0.35 | 3.05 | 0 |
| 30 | 0.39 | 0.00 | 1.80 |
| 60 | 0.36 | 0.00 | 3.59 |
| 90 | 0.35 | 0.00 | 5.39 |
| 120 | 0.30 | 0.00 | 7.19 |
| 150 | 0.06 | 0.04 | 8.96 |
| 180 | 0.28 | 2.70 | 9.17 |
| 210 | 0.35 | 3.22 | 9.07 |
| End of Run | 0.35 | 3.18 | |

TABLE V

Sieve Size: 4A-Run 3

| Time (Min.) | $H_2$ (%) | $CO_2$ (%) | $CO_2$ Adsorbed (grams) |
|---|---|---|---|
| 0 | 0.33 | 3.50 | 0 |
| 30 | 0.26 | 0.14 | 1.98 |
| 60 | 0.23 | 0.03 | 4.02 |
| 90 | 0.34 | 0.00 | 6.09 |
| 120 | 0.34 | 0.01 | 8.15 |
| 150 | 0.36 | 0.02 | 10.20 |
| 165 | 0.33 | 0.62 | 11.04 |
| 210 | 0.34 | 3.39 | 11.14 |
| End of Run | 0.32 | 3.47 | |

TABLE VI

Sieve Size: 4A-Run 4

| Time (Min.) | $H_2$ (%) | $CO_2$ (%) | $CO_2$ Adsorbed (grams) |
|---|---|---|---|
| 0 | 0.37 | 3.05 | 0 |
| 30 | 0.20 | 0.13 | 1.72 |
| 90 | 0.26 | 0.07 | 5.23 |
| 120 | 0.38 | 0.02 | 7.02 |
| 150 | 0.38 | 0.47 | 8.54 |
| 165 | 0.38 | 2.37 | 8.74 |
| 180 | 0.13 | 0.99 | 9.34 |
| 210 | 0.38 | 3.28 | 9.21 |
| End of Run | 0.35 | 3.06 | |

TABLE VII

Sieve Size: 4A-Run 5

| Time (Min.) | $H_2$ (%) | $CO_2$ (%) | $CO_2$ Adsorbed (grams) |
|---|---|---|---|
| 0 | 0.47 | 2.72 | 0 |
| 30 | — | 0.00 | 1.60 |
| 60 | 0.30 | 0.00 | 3.21 |
| 90 | 0.25 | 0.00 | 4.81 |
| 120 | 0.27 | 0.00 | 6.41 |
| 150 | 0.27 | 0.04 | 7.99 |
| 165 | 0.30 | 0.82 | 8.55 |
| 180 | 0.33 | 2.59 | 8.59 |
| 210 | 0.32 | 2.87 | 8.50 |
| End of Run | 0.33 | 2.82 | |

TABLE VIII

Sieve Size: 5A-Run 1

| Time (Min.) | $H_2$ (%) | $CO_2$ (%) | $CO_2$ Adsorbed (grams) |
|---|---|---|---|
| 0 | 0.43 | 3.34 | 0 |
| 30 | 0.36 | 0.02 | 1.96 |
| 60 | 0.44 | 0.01 | 3.92 |
| 90 | 0.44 | 0.00 | 5.89 |
| 120 | 0.45 | 0.00 | 7.86 |
| 150 | 0.45 | 0.00 | 9.82 |
| 180 | 0.20 | 0.04 | 11.77 |
| 210 | 0.43 | 2.33 | 12.37 |
| End of Run | 0.42 | 3.32 | |

TABLE IX

Sieve Size: 5A-Run 2

| Time (Min.) | $H_2$ (%) | $CO_2$ (%) | $CO_2$ Adsorbed (grams) |
|---|---|---|---|
| 0 | 0.35 | 2.75 | 0 |
| 30 | 0.40 | 0.00 | 1.62 |
| 60 | 0.39 | 0.00 | 3.24 |
| 90 | 0.37 | 0.00 | 4.86 |
| 120 | 0.38 | 0.01 | 6.48 |
| 150 | 0.34 | 0.00 | 8.09 |
| 165 | 0.37 | 0.03 | 8.90 |
| 180 | 0.36 | 0.50 | 9.56 |
| 210 | — | — | 11.18 |
| End of Run | 0.37 | 0.03 | |

TABLE X

Sieve Size: 5A-Run 3

| Time (Min.) | H$_2$ (%) | CO$_2$ (%) | CO$_2$ Adsorbed (grams) |
| --- | --- | --- | --- |
| 0 | 0.44 | 2.70 | 0 |
| 30 | 0.47 | 0.00 | 1.59 |
| 60 | 0.48 | 0.00 | 3.18 |
| 90 | 0.47 | 0.00 | 4.77 |
| 120 | 0.49 | 0.00 | 6.36 |
| 150 | 0.43 | 0.01 | 7.95 |
| 165 | 0.43 | 0.10 | 8.71 |
| 180 | 0.43 | 0.74 | 9.29 |
| 210 | 0.42 | 2.50 | 9.41 |
| End of Run | 0.42 | 2.37 | |

TABLE XI

Sieve Size: 13X

| Time (Min.) | H$_2$ (%) | CO$_2$ (%) | CO$_2$ Adsorbed (grams) |
| --- | --- | --- | --- |
| 0 | 0.38 | 3.02 | 0 |
| 30 | 0.24 | 0.00 | 1.78 |
| 60 | 0.39 | 0.00 | 3.56 |
| 90 | 0.40 | 0.00 | 5.34 |
| 120 | 0.39 | 2.58 | 5.60 |
| 150 | 0.32 | 5.14 | 4.35 |
| 180 | 0.37 | 5.20 | 3.06 |
| 210 | 0.38 | 2.92 | 3.12 |
| End of Run | 0.37 | 3.32 | |

Results:

For the respective sieve sizes the averages are:

TABLE XII

| Sieve Sizing | No. Runs | CO$_2$ gms Removed | Equiv gms Na$_2$CO$_3$ | Primary Scrubber gms Cl$_2$ | Regen. Scrubber gms Cl$_2$ |
| --- | --- | --- | --- | --- | --- |
| 3A | 1 | NO SIGNIFICANT REMOVAL OF CO$_2$ | | | |
| 4A | 5 | 9.63 | 23.21 | 26.1 | 2.96 |
| 5A | 3 | 10.99 | 26.47 | 9.63 | 15.54 |
| 13X | 1 | 4.44 | 10.70 | 0.15 | 20.92 |

In the removal process, the desired result is to have a high quantity of chlorine (for recovery to produce quality bleach and low carbonate) in the Primary Scrubber and as low as possible in the Regeneration Scrubber. The results demonstrate as a comparison between 13X and 4A nearly a 200-fold improvement and for 5A an improvement was seen of nearly a three (actual number is 2.71)fold improvement From the operation testing no substantial removal of CO$_2$ for 3A was obtained. In addition, no significant change in the hydrogen concentration in the gas stream was seen.

While the invention has been described above with reference to specific embodiments thereof, it is apparent that many changes, modifications, and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A process for removing chlorine gas from an unpurified chlorine-, hydrogen-, and carbon dioxide tail gas stream comprising the steps of:

(a) contacting a an unpurified chlorine-, hydrogen-, and carbon dioxide-containing tail gas stream with a zeolite molecular sieve having a molecular pore diameter greater than the molecular diameter of the carbon dioxide and hydrogen and smaller than the molecular diameter of chlorine so that at least a portion of the carbon dioxide is absorbed onto the molecular sieve, and thereby producing a purified tail gas stream that contains substantially all of the chlorine and hydrogen values and a reduced or no amount of carbon dioxide values; and (b) contacting the purified tail gas stream with an aqueous sodium hydroxide scrubbing solution for a sufficient amount of time in order to remove substantially all of the chlorine values from the purified tail gas stream, whereby producing a purified sodium hypochlorite solution that is substantially free of sodium carbonate.

2. The process of claim 1 wherein the unpurified tail gas stream contains from about 0.1% to about 10% by volume chlorine.

3. The process of claim 2 wherein the unpurified tail gas stream contains from about 0.1% to about 4% by volume hydrogen.

4. The process of claim 1 wherein the unpurified tail gas stream contains about 0.1 to about 4% by volume carbon dioxide.

5. The process of claim 1 wherein the molecular sieve material has a pore size of about 4 to about 10 angstroms.

6. The process of claim 5 wherein the molecular sieve material has a pore of about 4 to about 5 angstroms.

7. The process of claim 1 wherein the sodium hydroxide scrubbing solutions contains about 15% to about 50% by weight NaOH.

8. The process of claim 1 wherein the purified sodium hypochlorite solutions contains about 5% to about 32% NaOCl.

* * * * *